(12) United States Patent
Kent

(10) Patent No.: US 12,161,954 B2
(45) Date of Patent: Dec. 10, 2024

(54) PASSIVE MEMBRANE FILTRATION SYSTEM WITH PRE-TREATMENT

(71) Applicant: BIO CLEAN ENVIRONMENTAL SERVICES, LLC, Atlanta, GA (US)

(72) Inventor: Zachariha J. Kent, Fair Oaks Ranch, TX (US)

(73) Assignee: BIO CLEAN ENVIRONMENTAL SERVICES, LLC, Atlanta, GA (US)

( * ) Notice: Subject to any disclaimer, the term of this patent is extended or adjusted under 35 U.S.C. 154(b) by 0 days.

(21) Appl. No.: 16/571,449

(22) Filed: Sep. 16, 2019

(65) Prior Publication Data

US 2020/0179826 A1   Jun. 11, 2020

Related U.S. Application Data

(63) Continuation-in-part of application No. 16/429,204, filed on Jun. 3, 2019, now abandoned, which is a
(Continued)

(51) Int. Cl.
*B01D 21/00* (2006.01)
*B01D 29/52* (2006.01)
(Continued)

(52) U.S. Cl.
CPC ....... *B01D 21/0012* (2013.01); *B01D 21/003* (2013.01); *B01D 21/0033* (2013.01); *B01D 29/52* (2013.01); *C02F 1/004* (2013.01); *E03F 5/14* (2013.01); *E03F 5/16* (2013.01); *B01D 2201/0476* (2013.01);
(Continued)

(58) Field of Classification Search
CPC ............ B01D 21/0012; B01D 21/0033; B01D 21/003; B01D 29/52; B01D 29/005; B01D 29/21; B01D 2201/0476; B01D 2201/291; B01D 2201/24; B01D 35/0276; C02F 1/004; C02F 2201/006; C02F 2201/002; C02F 2103/001; C02F 2209/40; E03F 5/16; E03F 5/14
See application file for complete search history.

(56) References Cited

U.S. PATENT DOCUMENTS 2,468,862 A * 5/1949 Briggs .................. B01D 27/06
                                                        210/457
4,150,683 A    4/1979 Simon
(Continued)

OTHER PUBLICATIONS

Brueske, C.C. 2000.Technology review: ultra-urban stormwater treatment technologies (Year: 2000).*
(Continued)

*Primary Examiner* — Liam Royce
(74) *Attorney, Agent, or Firm* — THOMPSON HINE LLP

(57) ABSTRACT

The present invention discloses an improved multiple filtration cartridge assembly comprising filter cartridges with internal riser tubes mounted on a collection rail via rail couplers. Within this configuration, at least one internal riser tube contains a drain down orifice which corresponds to a matching drain down orifice on the rail coupler. The disclosed assembly increases the lifespan of the filter cartridges. Further, the multiple filtration cartridge assembly may be configured as a filtration mechanism within a variety of Structural Best Practice Management water filtration systems.

19 Claims, 12 Drawing Sheets

Related U.S. Application Data continuation of application No. 15/442,466, filed on Feb. 24, 2017, now Pat. No. 10,307,696, which is a continuation of application No. 14/145,765, filed on Dec. 31, 2013, now Pat. No. 9,604,160.

(51) Int. Cl.
   *C02F 1/00* (2023.01)
   *E03F 5/14* (2006.01)
   *E03F 5/16* (2006.01)
   *C02F 103/00* (2006.01)

(52) U.S. Cl.
   CPC .. *C02F 2103/001* (2013.01); *C02F 2201/002* (2013.01); *C02F 2201/006* (2013.01); *C02F 2209/40* (2013.01)

(56) References Cited

U.S. PATENT DOCUMENTS

| | | | |
|---|---|---|---|
| 5,707,527 | A | 1/1998 | Knutson et al. |
| 5,820,762 | A | 10/1998 | Barner et al. |
| 6,217,757 | B1 | 4/2001 | Fleischmann |
| 6,524,473 | B2 | 2/2003 | Williamson |
| 6,998,038 | B2 | 2/2006 | Howard |
| 7,214,311 | B2 | 5/2007 | Aberle et al. |
| 7,494,585 | B2 | 2/2009 | Nino |
| 8,137,564 | B2 | 3/2012 | Gannon |
| 8,147,688 | B2 | 4/2012 | Adams et al. |
| 8,491,797 | B1 | 7/2013 | Happel |
| 2003/0121846 | A1 | 7/2003 | Use |
| 2007/0068878 | A1 | 3/2007 | Stever et al. |
| 2009/0255868 | A1 | 10/2009 | Allen, II et al. |
| 2011/0168612 | A1 | 7/2011 | Happel |
| 2011/0192773 | A1 | 8/2011 | Kent |
| 2013/0180903 | A1 | 1/2013 | Kowalsky |
| 2013/0228527 | A1 | 8/2013 | Crasti |
| 2014/0027362 | A1 | 1/2014 | Kent |
| 2014/0042120 | A1 | 2/2014 | Allard |

OTHER PUBLICATIONS

Oldcastle Precast, Inc., "PerkFilter Media Filtration", Online Brochure available at https://oldcastleinfrastructure.com/brands/perkfilter/ (Retrieved Mar. 2, 2020), Sep. 28, 2015, 2 pages.

Contec Engineered Solutions, LLC, "The Stormwater Management StormFilter", Online Brochure available at: https://www.conteches.com/stormwater-management/treatment/stormwater-management-stormfilter (Retrieved Mar. 2, 2020), 2019, 6 pages.

* cited by examiner

PASSIVE MEMBRANE FILTRATION SYSTEM WITH PRE-TREATMENT

CROSS-REFERENCE TO RELATED APPLICATION

This application is a continuation in part of U.S. patent application Ser. No. 16/429,201 filed Jun. 3, 2019 entitled "PARTITIONED WATER TREATMENT SYSTEMS WITH VERTICAL FILTRATION UNITS", which is a continuation patent application of U.S. patent application Ser. No. 15/442,446 filed Feb. 24, 2017, now U.S. patent Ser. No. 10/307,696; which is a continuation of Ser. No. 14/145,765 filed Nov. 10, 2014, now U.S. Pat. No. 9,604,160, which are incorporated herein by reference in their entirety as if set forth in full.

FIELD OF THE INVENTION

The invention relates to the fields of water filtration systems and surface runoff water conveyance systems.

BACKGROUND OF THE INVENTION AND PRIOR ART

Water treatment systems have been in existence for many years. These systems treat stormwater surface runoff or other polluted water. Stormwater runoff is of concern for two main reasons: i. volume and flow rate, and ii. pollution and contamination. The volume and flow rate of stormwater runoff is a concern because large volumes and high flow rates can cause erosion and flooding. Pollution and contamination of stormwater runoff is a concern because stormwater runoff flows into our rivers, streams, lakes, wetlands, and/or oceans. Pollution and contamination carried by stormwater runoff into such bodies of water can have significant adverse effects on the health of ecosystems.

The Clean Water Act of 1972 enacted laws to improve water infrastructure and quality. Sources of water pollution have been divided into two categories: point source and non-point source. Point sources include wastewater and industrial waste. Point sources are readily identifiable, and direct measures can be taken to mitigate them. Non-point sources are more difficult to identify. Stormwater runoff is the major contributor to non-point source pollution. Studies have revealed that contaminated stormwater runoff is the leading cause of pollution to our waterways. As we build houses, buildings, parking lots, roads, and other impervious areas, we increase the amount of water that runs into our stormwater conveyance systems and eventually flows into rivers, lakes, streams, wetlands, and/or oceans. As more land becomes impervious, less rain seeps into the ground, resulting in less groundwater recharge and higher velocity flows, which cause erosion and increased pollution levels of watery environments.

Numerous sources introduce pollutants into stormwater runoff. Sediments from hillsides and other natural areas exposed during construction and other human activities are one source of such pollutants. When land is stripped of vegetation, stormwater runoff erodes the exposed land and carries it into storm drains. Trash and other debris dropped on the ground are also carried into storm drains by stormwater runoff. Another source of pollutants is leaves and grass clippings from landscaping activities that accumulate on hardscape areas and do not decompose back into the ground, but flow into storm drains and collect in huge amounts in lakes and streams. These organic substances leach out large amounts of nutrients as they decompose and cause large algae blooms, which deplete dissolved oxygen levels in marine environments and result in expansive marine dead zones. Unnatural stormwater polluting nutrients include nitrogen, phosphorus, and ammonia that come from residential and agricultural fertilizers.

Heavy metals that come from numerous sources are harmful to fish, wildlife, and humans. Many of our waterways are no longer safe for swimming or fishing due to heavy metals introduced by stormwater runoff. Heavy metals include zinc, copper, lead, mercury, cadmium and selenium. These metals come from vehicle tires and brake pads, paints, galvanized roofs and fences, industrial activities, mining, recycling centers, etc. Hydrocarbons are also of concern and include oils, gas, and grease. These pollutants come from leaky vehicles and other heavy equipment that use hydraulic fluid, brake fluid, diesel, gasoline, motor oil, and other hydrocarbon based fluids. Bacteria and pesticides are additional harmful pollutants carried into waterways by stormwater runoff.

Over the last 20 years, the Environmental Protection Agency (EPA) has been monitoring the pollutant concentrations in most streams, rivers, and lakes in the United States. Over 50% of waterways in the United States are impaired by one of more of the above-mentioned pollutants. As part of the EPA Phase 1 and Phase 2 National Pollutant Discharge Elimination Systems, permitting requirements intended to control industrial and nonindustrial development activities have been implemented. Phase 1 was initiated in 1997 and Phase 2 was initiated in 2003. While there are many requirements for these permits, the main requirements focus on pollution source control, pollution control during construction, and post construction pollution control. Post construction control mandates that any new land development or redevelopment activities incorporate methods and solutions that both control increased flows of surface water runoff from the site and decrease (filter out) the concentration of pollutants off the site. These requirements are commonly known as quantity and quality control. Another part of these requirements is for existing publicly owned developed areas to retrofit the existing drainage infrastructure with quality and quantity control methods and technologies that decrease the amount of surface water runoff and pollutant concentrations therein.

A major category of technologies used to meet these requirements are referred to as structural best management practices (BMPs). Structural BMPs include proprietary and non-proprietary technologies designed to store and/or remove pollutants from stormwater. Technologies such as detention ponds and regional wetlands are used to control the volume of surface water runoff while providing some pollutant reduction capabilities. Various rain water runoff treatment technologies such as catch basin filters, hydrodynamic separators, and other filters are used to remove pollutants.

One of the limitations to these systems known to those familiar with the art is the lifespan of filters used within the systems. Several methods have been employed with varying levels of success to expand the life of filters. Some of these modifications have resulted in introductions of new problems needing to be solved.

One solution is the addition of pre-treatment sediment separation chambers as taught by Kent in the related U.S. Pat. No. 9,604,160 and corresponding co-pending applications. The utilization of pre-treatment chambers allows for larger particles to separate out of the treated stormwater prior to reaching the filter devices and filtration media;

thereby reducing sediment load on the filter devices and filtration media in the system.

A different attempt to solve filter lifespan problems is with the commercially available StormFilter® by Contech Engineered Solutions, LLC. Here mechanical devices such as a float valve, siphon and a self-cleaning hood are attached to a filter cartridge to draw water evenly through the media. While these mechanisms in combination utilize the entire filter cartridge, thereby dispersing sediment load; it introduces several new problems such as mechanical failure of the moving parts utilized by this system to evenly distribute the water. These parts can easily become clogged with sediment and malfunction, thus limiting or preventing the solutions the devices were intended to solve.

To overcome the limitations in the prior art described above and to overcome other limitations which will become apparent upon reading and understanding the present invention, a novel method, system, and apparatus of extending the lifespan of filter cartridges leading to overall functional improvements of Structural BMPs are disclosed.

SUMMARY OF THE INVENTION

The invention provides an exemplary method, system, and apparatuses depicted, of an improved multiple filtration cartridge assembly to be utilized with a structural BMP system comprising a collection rail coupled with filter cartridges with internal riser tubes and at least one drain down orifice. The filter cartridges filter water through a permeable filter material, drawing rising water levels into the top of the riser tubes, then falling to the bottom of the riser tube(s) thereafter passively rising through the filter material of the filter cartridge(s) via water pressure created on the outside of the riser tube and between the internal casing of the filter cartridge. The riser tubes allow passive, even upflow distribution of stormwater to move within the filter cartridges to utilize the entire filter material of the filter cartridge. The addition of the riser tubes design is to solve a problem well-known in the art of increasing the lifespan of the filter cartridges. Without riser tubes, a similar Structural BMP infrastructure, such as that described in the co-pending application cited by Kent and referenced above, the bottoms of filter cartridges become disproportionately over-saturated with particulate pollutants under conditions when lower-flow stormwater levels frequently enter the system. Under such conditions, the treated stormwater does not entirely fill the filtration chambers; therefore, the bottoms of the filter cartridges have a higher particulate pollutant load than the tops of the filter cartridges. This results in an increase in costs and a waste of materials because the entire filter must be replaced more frequently even if the upper portions of the filter cartridge exhibit little use. It also causes uneven flow rates throughout the cartridge which reduces performance. In one of the many embodiments of the disclosure herein, the improved multiple filtration cartridge assembly is installed within a partitioned water treatment system comprised of a box configured for installation into a flow stream of a surface runoff water conveyance infrastructure (SRWC infrastructure). The partitioned water treatment system with pretreatment disclosed is herein referred to as "box" or "box system".

An example of improvement of filter cartridge effectiveness and lifespan is demonstrated in FIG. 12. The testing data was collected over 33 test runs at an independent testing lab, Good Harbours Laboratory located in Mississauga, Ontario, Canada. The system, containing 16 cartridges was loaded with 434 pounds of sediment without any loss of flow capacity. Table 1 demonstrates the performance of improved multiple filtration cartridge assembly within a partitioned water treatment system. Overall sediment (TSS) removal efficiency was 89 percent.

The novel incorporation of riser tubes with passive water flow distribution prevents the accumulation of sediment load which occurs only in the lower sections of the filter cartridge in systems described herein without riser tubes. Importantly, the riser tubes do not require any other devices or components to mechanically transport the filtered water from the bottom to the top of the filter, thus is solves another problem well-known in the art of the failure of mechanical devices attached to filter cartridges intended to improve function of a filter cartridge.

DETAILED DESCRIPTION OF THE INVENTION

Figure 1:
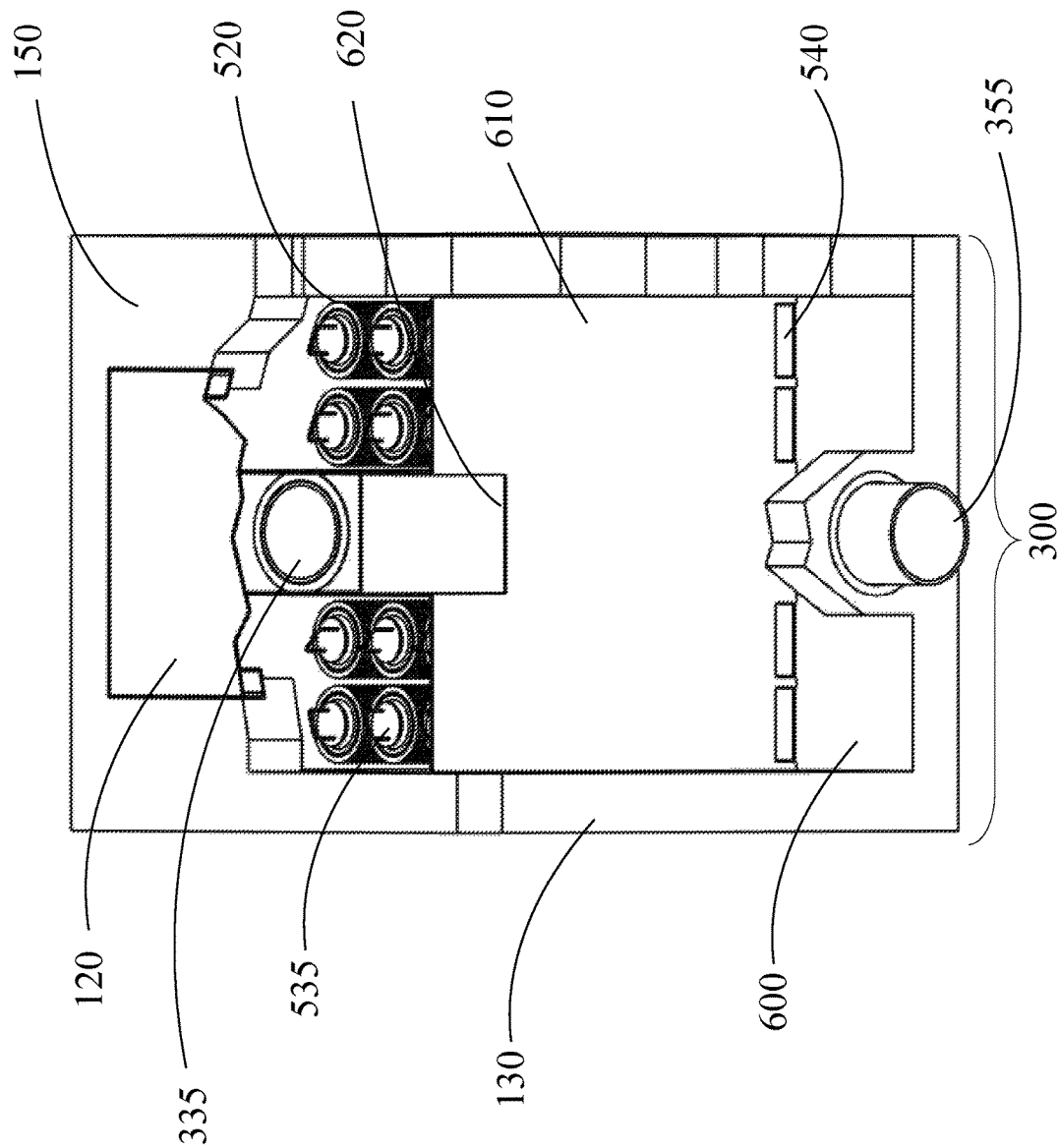
FIG. 1. Illustrates a perspective view, cut-out schematic of the multiple filtration cartridge assembly in a box system, with discharge chamber visible, in accordance with one embodiment.

The present invention provides an improved multiple filtration cartridge assembly 650 comprising filter cartridges 520 with internal riser tubes 560, mounted on a collection rail 540 via rail couplers 545. Within this configuration, at least one internal riser tube 560 contains a drain down orifice 640 which corresponds to a matching drain down orifice 640 on the rail coupler 545. The multiple filtration cartridge assembly 650 may be configured as a filtration mechanism within a variety of Structural BMPs, where herein, one example is that of the multi-chamber filtration box 300, previously presented in the related patent applications.

The partitioned water treatment system, or box system 300 as described in corresponding Kent U.S. patent application Ser. No. 16/429,204 filed Jun. 3, 2019, possessing a plurality of separation and filtration chambers and filter mechanisms, further as presented herein, includes the improved multiple filtration cartridge assembly 650. Together the box 300 with the multiple filtration cartridge assembly 650 are operative to control and filter surface runoff water and increase the lifespan of the filter cartridges 520. Such box systems 300 typically have an overall shape of a box and are placed inline with runoff water conveyance system infrastructure, such as pipes, channels, ditches, canals, and water storage units. The box system 300 disclosed herein can comprise shapes such as triangular or circular. As such, the box system 300 maybe configured depending on site needs.

FIGS. 1-11 provide an example embodiment of a box system 300 comprising a plurality of exchangeable chambers: pretreatment, filtration and discharge, and filtering mechanisms including an oil skimmer, separation, and one or more multiple filtration cartridge assemblies 650.

Figure 2:
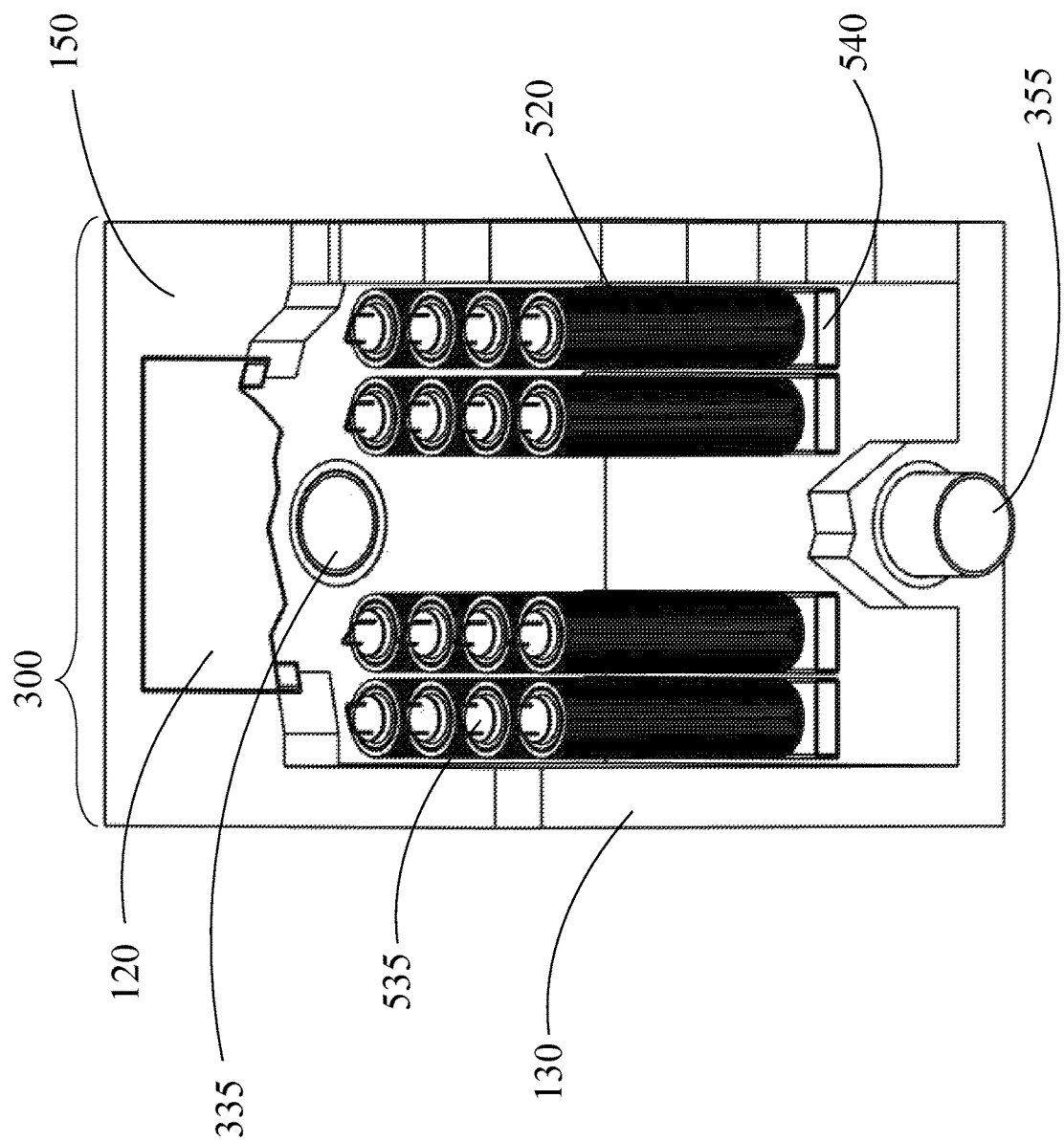
FIG. 2. Illustrates a perspective view, cut-out schematic of a multiple filtration cartridge assembly, with filter chambers visible, in accordance with one embodiment.
Figure 4:
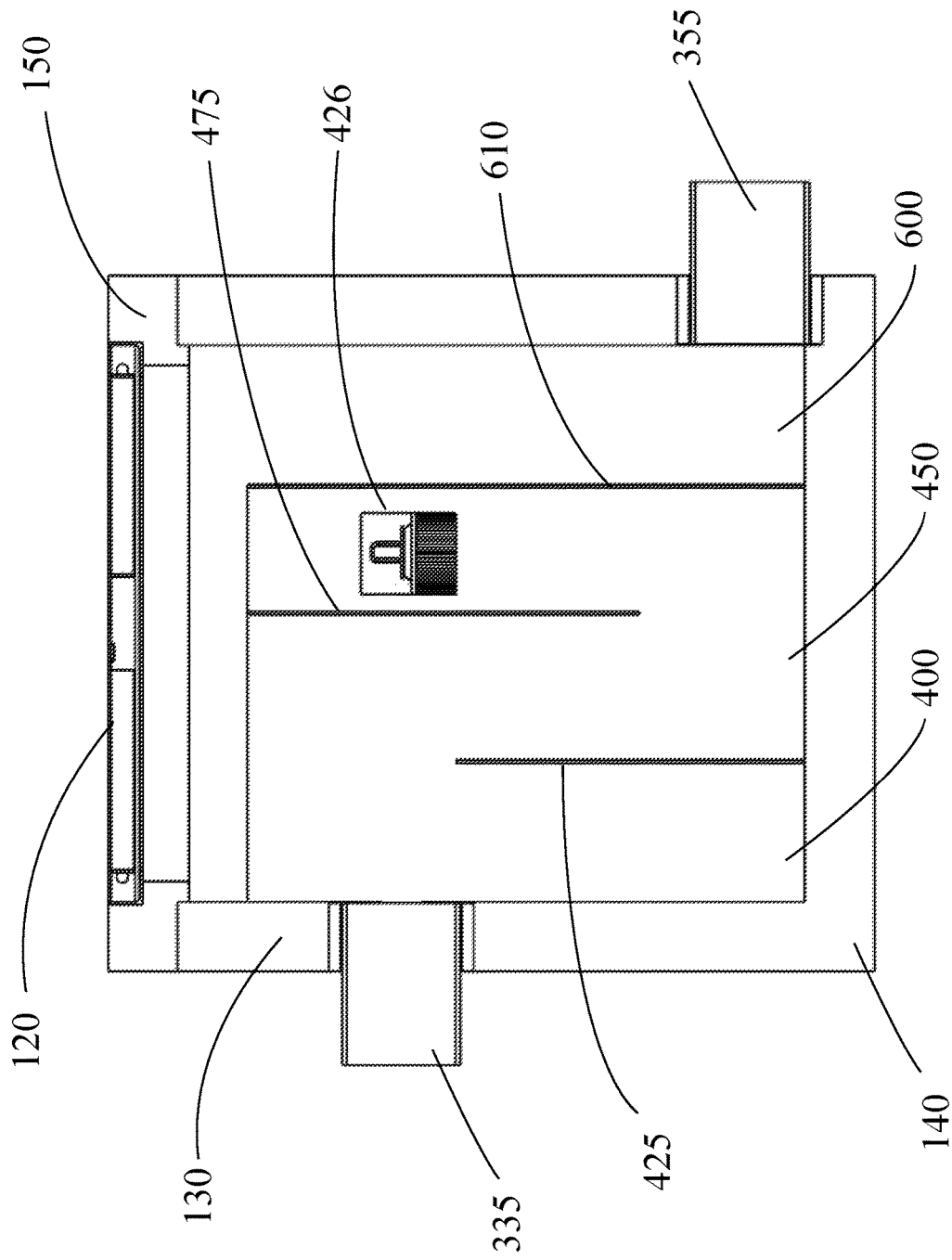
FIG. 4. Illustrates a side-view, cut-out schematic of the box system with the pre-treatment chamber configuration, in accordance with one embodiment.
Figure 5:
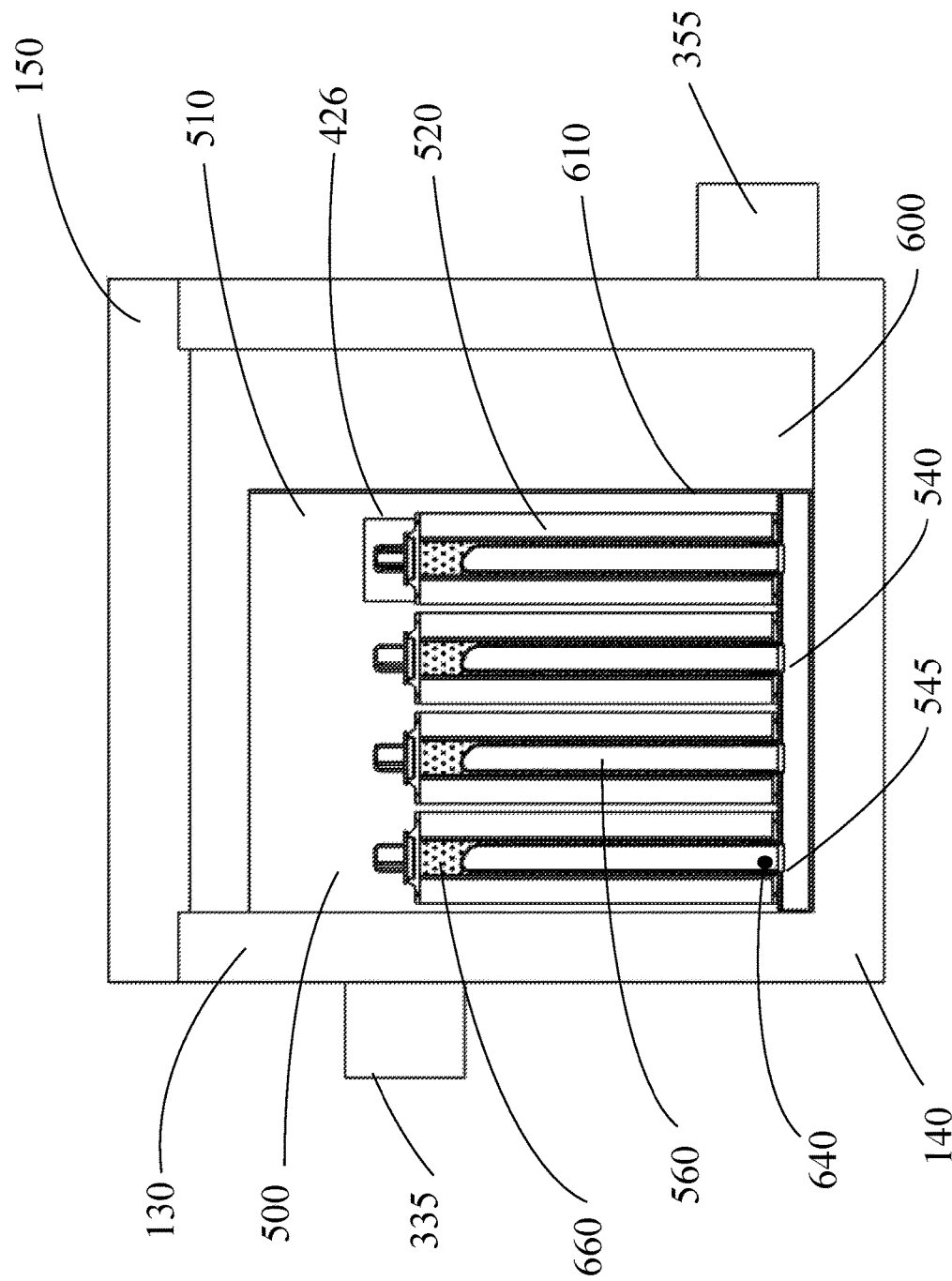
FIG. 5. Illustrates a side-view, cut-out schematic of the box system with multiple filtration cartridge assembly, in accordance with one embodiment.

FIGS. 1, 2, and 5 show different views of an embodiment of the box system 300 with vertical filter cartridges 520 and riser tubes 560, which are elements of the multiple filtration cartridge assembly 650, commonly located in a filtration chamber 500. FIGS. 1-5 collectively demonstrate a multiple filtration cartridge assembly 650 within the box system 300 as an example. FIGS. 6-11 demonstrate isolation views of the various elements of the present invention of the multiple filtration cartridge assembly 650.

In one embodiment, FIG. 1 presents a multiple filtration cartridge assembly 650 within the box system 300, wherein the box system 300 possesses a rectangular, square or round shape, an inflow opening 335, an outflow opening 355, and an access hatch 120. The system walls 130 and system top 150 are made of solid, durable, and strong material(s) such as concrete, metal, wood, stone, and fiberglass. Within the interior of the system walls 130 and beneath the system top 150 are elements of the box system 300, including: filter cartridges 520, removable filter cartridge caps 535, internal riser tubes 560 (not shown, presented in FIG. 5) and collection rails 540. Also depicted are the discharge chamber partition 610 and a bypass weir 620.

In FIG. 2, the cut-out schematic presents a box system 300 with system walls 130, includes a system top 150, an inflow opening 335, an outflow opening 355, and an access hatch 120. Within the interior of the system walls 130 and beneath the system top 150 are components of a multiple filtration cartridge assembly, including: filter cartridges 520, removable filter cartridge caps 535, internal riser tubes (not shown) and collection rails 540.

Figure 3:
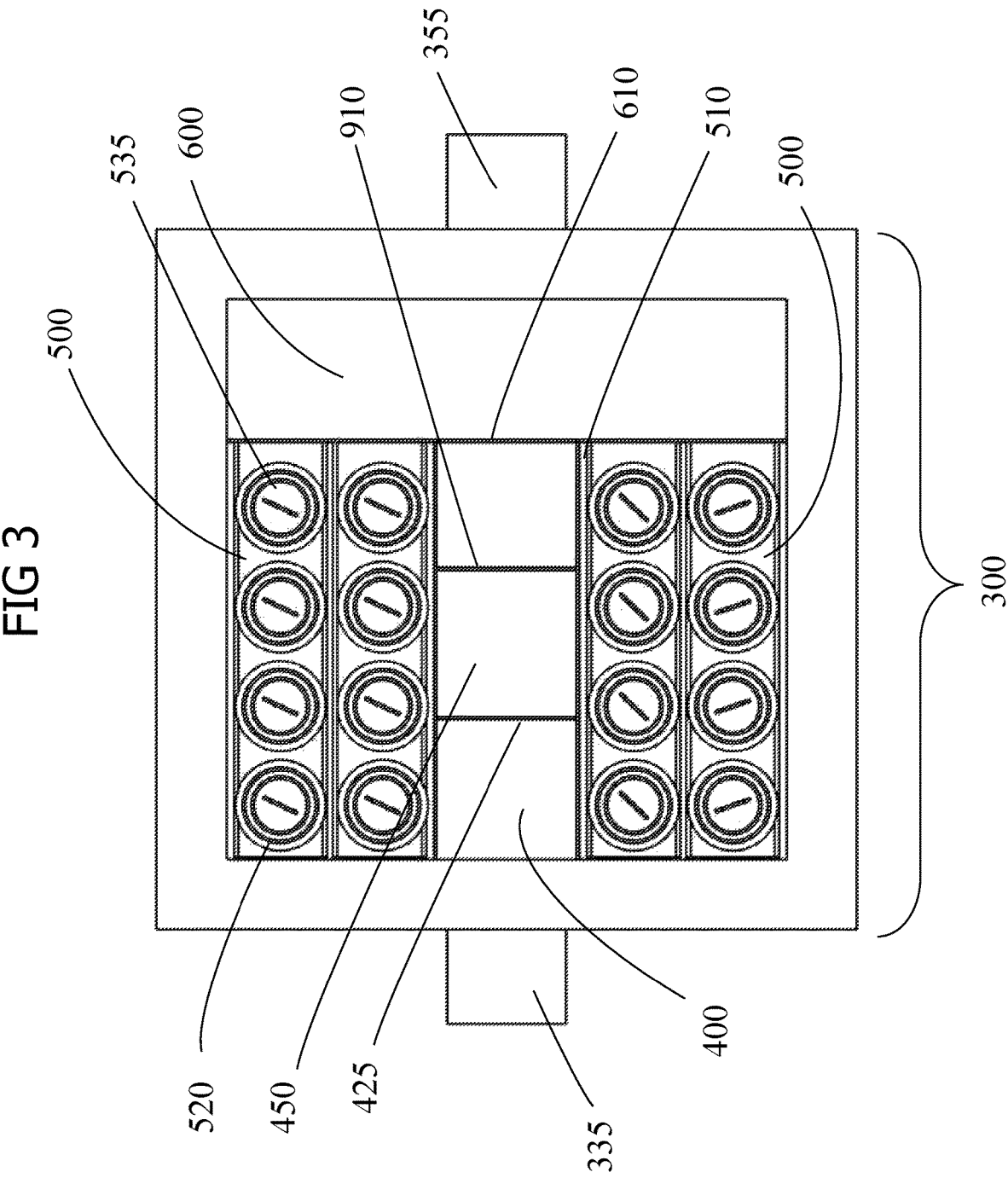
FIG. 3. Illustrates a top view of the box system, in accordance with one embodiment.

In accordance with one embodiment, FIG. 3 illustrates a top view of a box system 300 comprising a plurality of chambers, including a primary separation chamber 400, the secondary separation chamber 450, a separation chamber partition 425, a filtration chamber 500 housing multiple filtration cartridge assemblies and the discharge chamber 600, and the discharge chamber partition 610. Also shown is the inflow opening 335, the outflow opening 355, and a top view of some of the elements of multiple filtration cartridge assembly including the filter cartridges 520 with removable filter cartridge caps 535. FIG. 3 also shows a top view the box system 300 embodiment wherein an additional separation weir, an oil skimmer 910, which is operative to isolate hydrocarbons from water for later removal, mounted in secondary separation chamber 450. Inclusion of an oil skimmer 910 depends on site needs and regulations to provide additional filtration in support of the box system 300.

In accordance with one embodiment, FIG. 4 illustrates a side view of the box system 300. The box system 300 comprises several walls dividing the system into a primary separation chamber 400, secondary separation chamber 450, and discharge chamber 600, each possessing a rectangular or square shape. Separation chamber walls are each in sealed connection with each of first endwall, discharge chamber wall 610, separation chamber partition wall 425 of the box system 300, but not the ceiling of the box system 300, forming primary separation chamber 400 and secondary separation chamber 450. The top of separation chamber partition wall 425 is positioned below or equal to the bottom of inflow opening 335 and below the top of the section of separation chamber walls that abuts primary separation chamber 400 and a portion of secondary separation chamber 450. This configuration results in low to moderate amounts of water entering inflow opening 335 filling primary separation chamber 400 and then flowing over separation chamber partition wall 425 into secondary separation chamber 450. In the process, sufficiently dense and heavy waterborne sediment and debris are deposited in primary separation chamber 400 for later removal. Additionally, as first identified in the top view of FIG. 3, an additional separation weir, in this instance, an oil skimmer weir 910 may be included between the separation chamber partition wall 425 into secondary separation chamber 450. Inclusion of an oil skimmer 910 depends on site needs and regulations to provide additional filtration in support of the box system 300.

Further, in FIG. 4, the tops of separation chamber walls form diversion weirs (also referred to as "notches") abutting discharge chamber wall 610. The type of diversion weir illustrated is a low flow diversion weir 426. The bottom of low flow diversion weir(s) 426 are positioned substantially even with the top of separation chamber partition 425. This configuration results in low to moderate amounts of water flowing over the top of primary separation chamber partition 425, filling secondary separation chamber 450 and flowing through low flow diversion weir(s) 426 into filtration chambers 500 (not shown). In the process, sufficiently dense and heavy waterborne sediment and debris are deposited in secondary separation chamber 450 for later removal. In some embodiments, the bottom of low flow diversion weir (s) 426 is positioned below the top of separation chamber partition wall 425.

Referring again to FIG. 4, discharge chamber wall 610 is in sealed connection with each of lateral walls, second endwall, and floor 140 of a box system, but not the ceiling of the box system, forming discharge chamber 600. Outflow opening 355 is in fluid communication with conveyance pipe at a position abutting system floor of the box system. This configuration results in water entering discharge chamber 600 flowing into conveyance pipe. FIG. 4 also demonstrates an access hatch 120, system walls 130, and system floor 140.

In accordance with one embodiment, FIG. 5 illustrates a side cut-out view of the filtration chamber 500 within a box system 300. FIG. 5 also illustrates other elements of a box system with system top 150, system walls 130, and system floor 140 and an inflow opening 335 and outflow opening 355. The low flow diversion weir 426 provides an opening for the flow of water from a secondary chamber to a filtration chamber 500 through the filtration chamber wall 510. The discharge chamber partition 610 separates the filtration chamber 500 from the discharge chamber 600. The multiple filtration cartridge assembly 650 (best seen in FIG. 11) includes a collection rail 540, rail couplers 545, riser tubes 560 including one riser tube with a drain down orifice 640, filter cartridges 520 with perforated inner cartridge housing 660, and removable filter cartridge caps 535.

Figure 6:
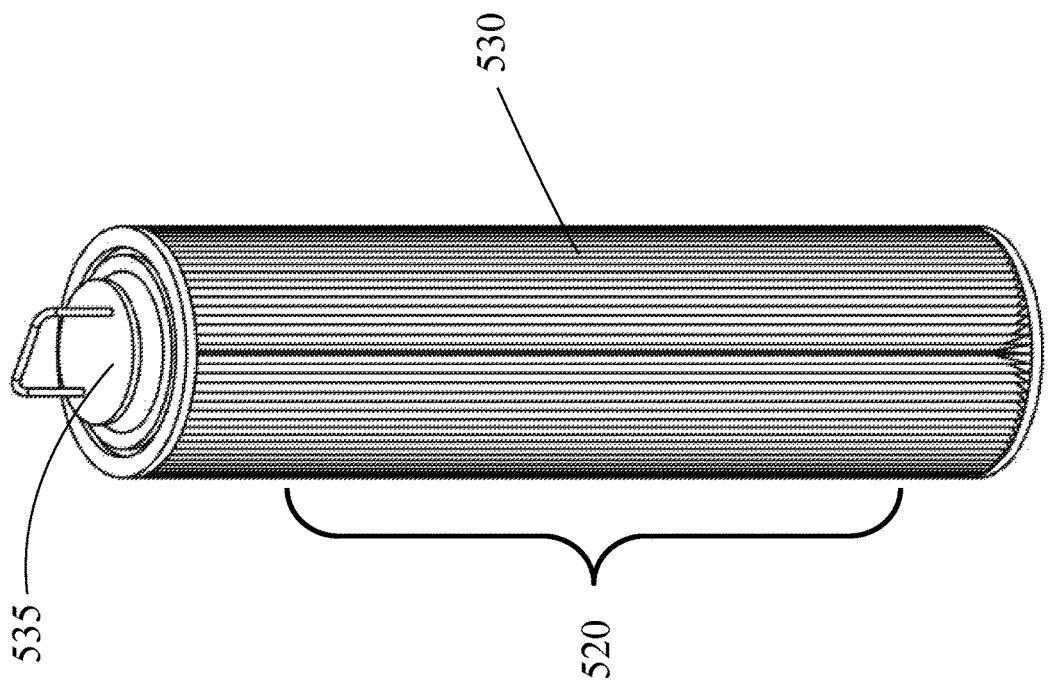
FIG. 6. Illustrates an isolation view of a filter cartridge, in accordance with one embodiment.

In accordance with one embodiment, FIG. 6, a filter cartridge 520 comprises a sheet of filter material 530, such as porous plastic, paper, or fiberglass, folded back and forth into a series of pleats formed into a hollow cylinder, the ends of which are sealed closed by water impermeable top end and bottom end that is only permeable to water through bottom end opening. The bottom end and top end are made from strong, durable material(s) such as metal, plastic, or fiberglass. The top end of a filter cartridge 520 also possesses removable filter cartridge cap 535. Filter cartridges 520 are operative to remove, from water flowing therethrough, waterborne particulate matter such as large and fine sediments and debris.

Figure 7:
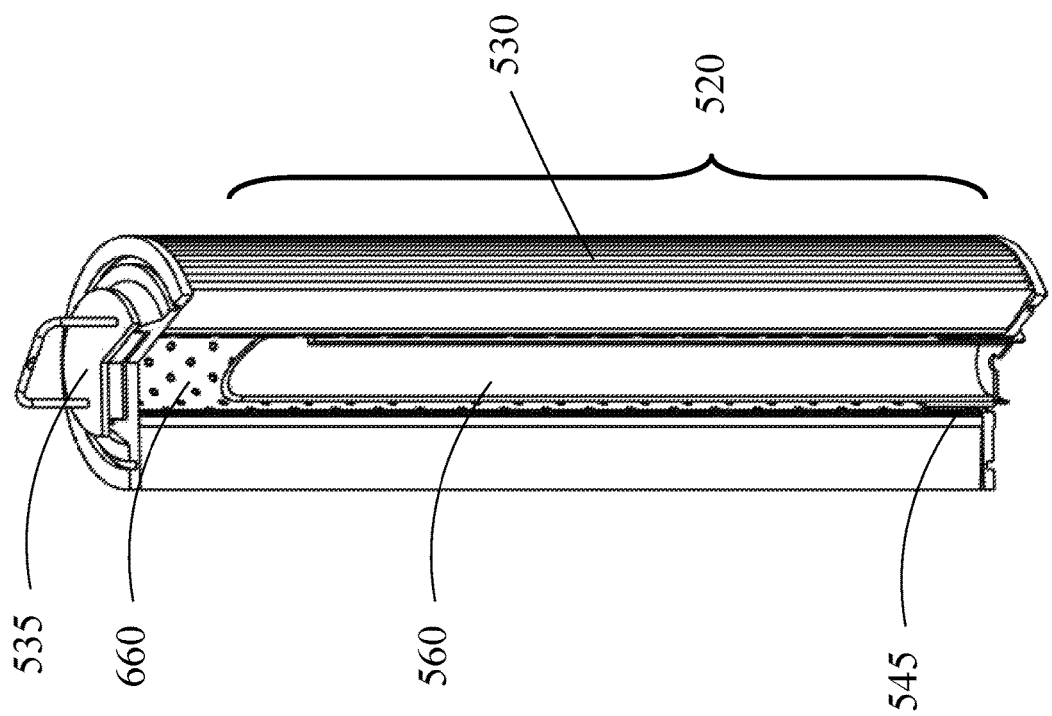
FIG. 7. Illustrates an isolation view, cut-out schematic of a filter cartridge, in accordance with one embodiment.
Figure 11:
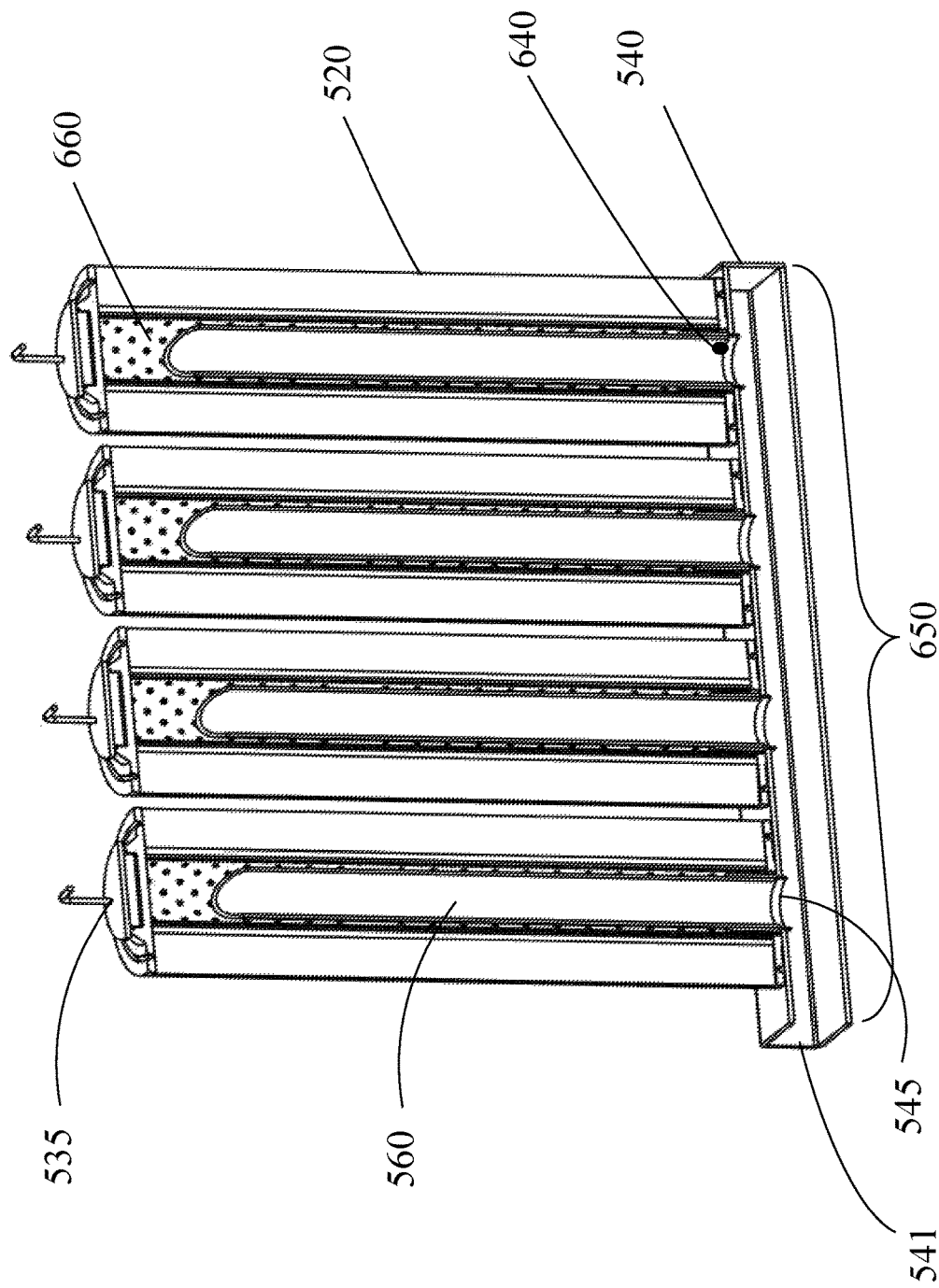
FIG. 11. Illustrates an isolation view, cut-out schematic of a multiple filtration cartridge assembly, in accordance with one embodiment.
Figure 12:
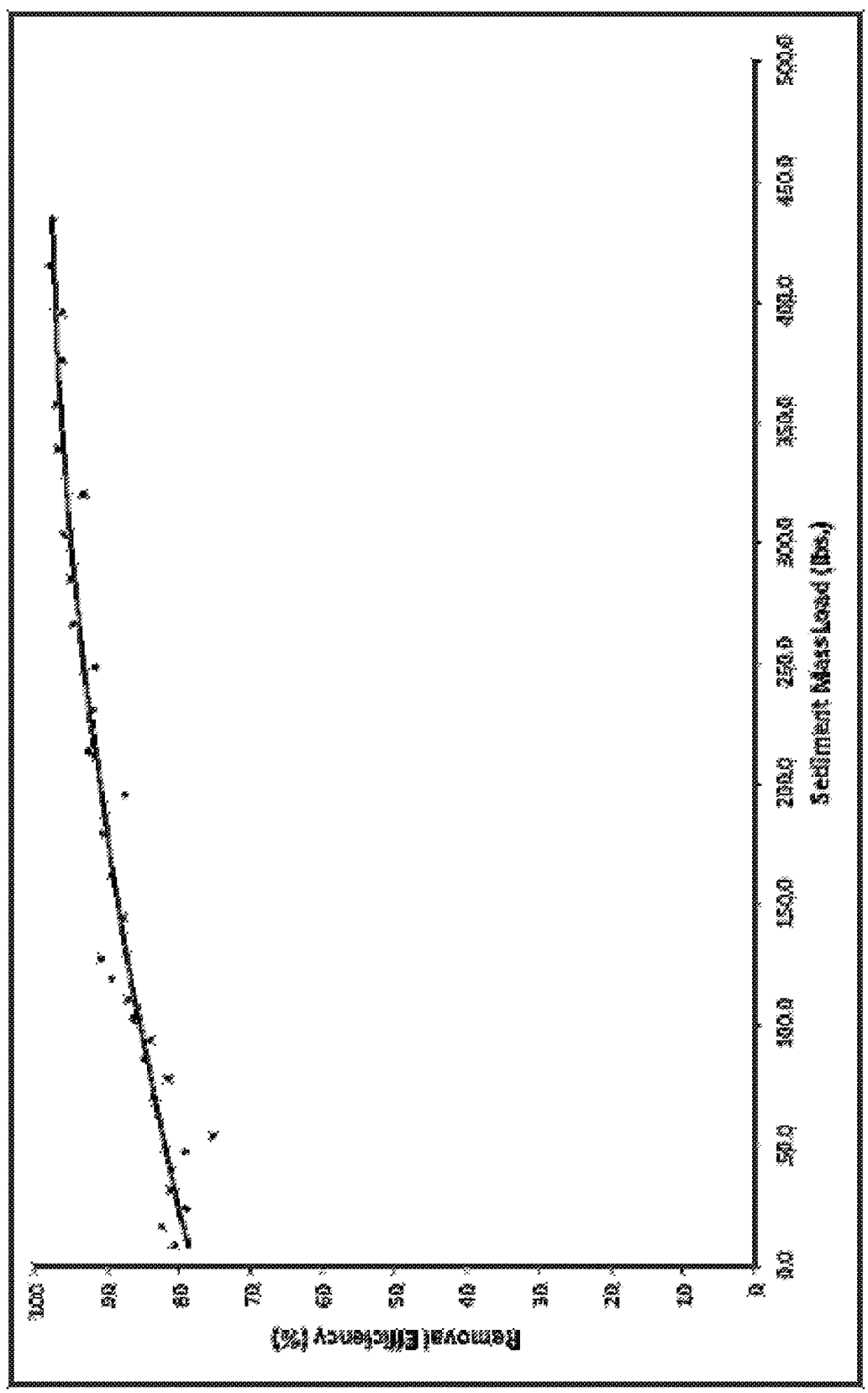
FIG. 12. Demonstrates the improvement of filter cartridge effectiveness and lifespan.

In accordance with one embodiment, FIG. 7 illustrates a cut-out schematic of a filter cartridge 520 and filter material 530 with an internal riser tube 560. Water enters the riser tube 560 through the filter material and through the perforated inner cartridge housing 660 of the filter cartridge. Also disclosed is a removable filter cartridge cap 535, and an attachment to the rail coupler 545. The entire assembly is mounted onto the collection rail 540 (as illustrated in FIG. 11).

Figure 8:
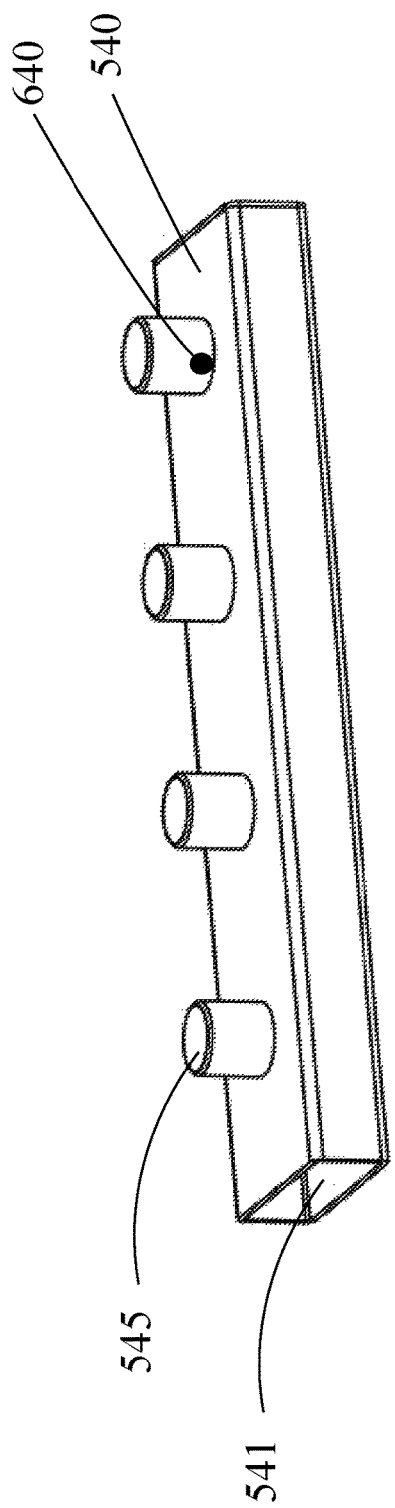
FIG. 8. Illustrates an isolation view of a collection rail, in accordance with one embodiment.
Figure 9:
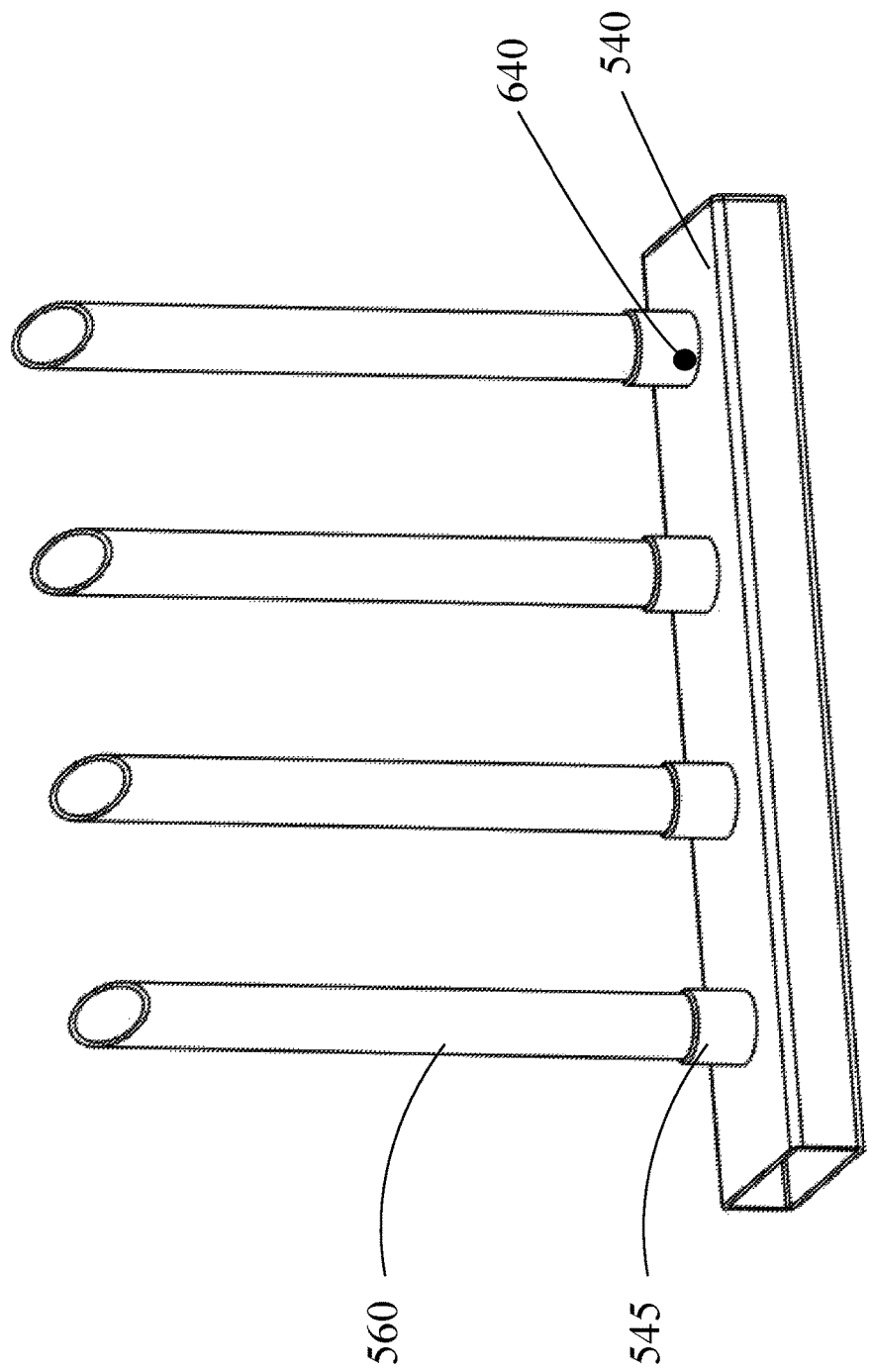
FIG. 9. Illustrates an isolation view of elements of the multiple filtration cartridge assembly comprising a collection rail, rail couplers with riser tubes, and a drain down orifice, in accordance with one embodiment.

In accordance with a preferred embodiment, FIG. 8 is an isolation view of a collection rail 540 and rail couplers 545 with a drain down orifice 640. FIGS. 5, 8, and 9 in combination illustrate how collection rails 540 with rail couplers 545 extend substantially the entire length of a filtration chamber 500, through a discharge chamber partition 610 and partway into a discharge chamber 600, in proximity with floor within the system walls 130. Collection rails 540 are made of strong and durable material(s) such as concrete, metal, plastic, or fiberglass and fixedly support filter cartridges 520 with internal riser tube 560 mounted thereon. Collection rails 540 possess an exit opening of the collection rail 541, are closed and water impermeable apart from water exit openings at their ends within a discharge chamber 600 and filter openings that are inline with each of the openings of bottom end opening of riser tubes 560 and mounted thereon by rail coupler 545 (see FIG. 9) and one or more drain down orifice 640. The drain down orifices 640 of at least one rail coupler 545 and inserted riser tube 560 allows water to passively drain down the riser tubes 560 and filter cartridges 520 after a storm event which results in a passive, self-cleaning of riser tubes 560 and filter cartridges 520, thus further improving the lifespan of the filter cartridges 520. Filter cartridges 520 are mounted over riser tubes 560 which is adapted to place filter cartridges 520 in sealed, fluid communication with riser tubes 560 to the collection rail 540 via rail couplers 545 (see FIG. 11). Filter cartridges 520 are each mounted on collection rails 540 in a manner that permits water to flow from filtration chambers 500 into collection rails 540 only by passing through the riser tube 560 within filter cartridges 520 accessed through bottom end openings of filter cartridges 520 and then through an exit opening of the collection rail 541 (see FIG. 11). This configuration results in low to moderate amounts of water filling filtration chambers 500 flowing first through filter cartridges 520 with internal riser tubes 560, then into collection rails 540, followed by entry into discharge chamber 600.

In accordance with one embodiment, FIG. 9 demonstrates an isolation view of a collection rail 540 and rail couplers 545 with one rail coupler containing a drain down orifice 640, and riser tubes 560. A corresponding drain down orifice 640 is located on at least one riser tube 560 (not shown) inserted into same rail coupler 545 with the drain down orifice 640 wherein water from the riser tube is in fluid connection via the drain down orifice with the corresponding rail coupler 545 with the drain down orifice 640. Riser tubes 560 may be made of durable material(s) such as metal, plastic, composite, or fiberglass.

Figure 10:
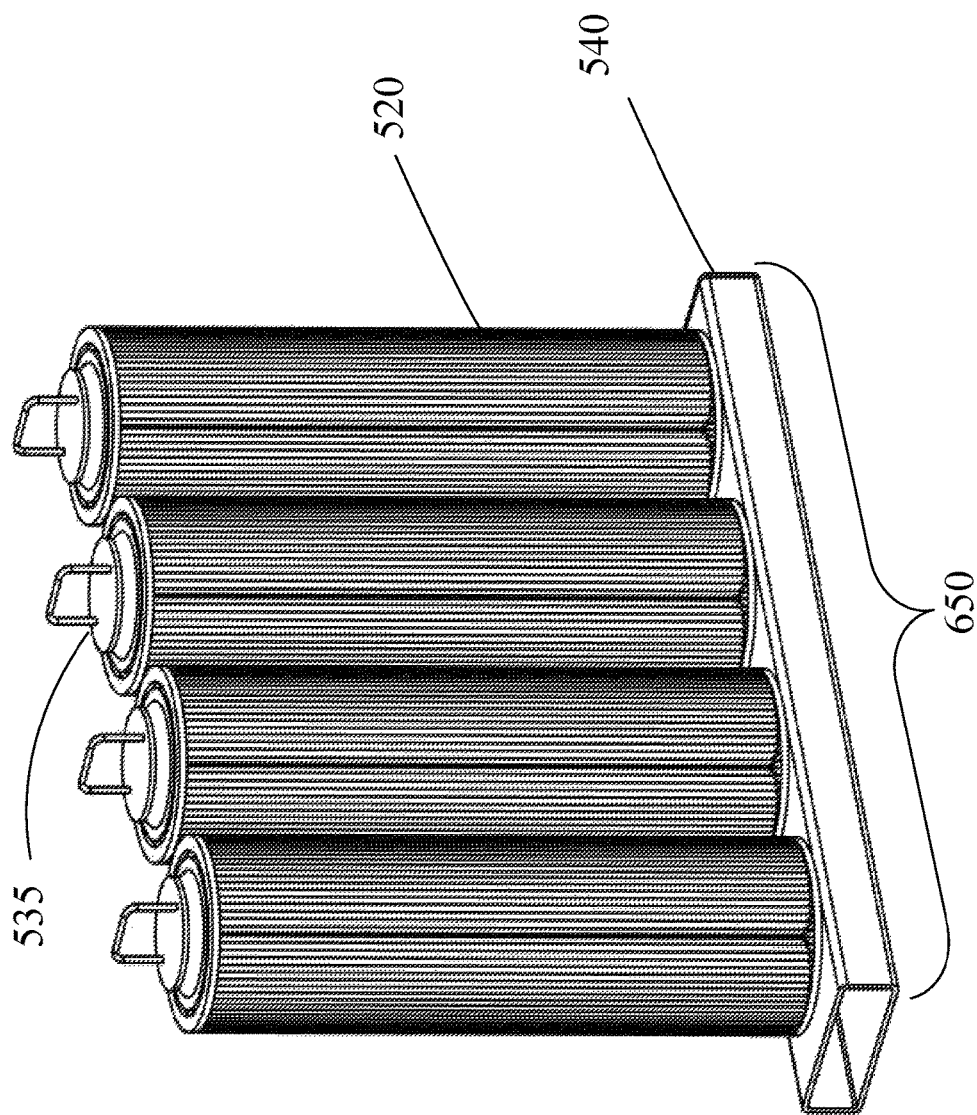
FIG. 10. Illustrates an isolation view of the multiple filtration cartridge assembly, in accordance with one embodiment.

In accordance with one embodiment, FIG. 10 is an external isolation illustration of a multiple filtration cartridge assembly 650 comprised of removable filter cartridge caps 535, filter cartridges 520, internal riser tubes 560 (not shown), and collection rail 540 wherein one end of the collection rail 540 depicts an opening for treated water to exit towards outflow opening 355 (not shown).

In accordance with a preferred embodiment, FIG. 11 illustrates a cut-out schematic of a multiple filtration cartridge assembly 650 comprising an assembly of filter cartridges 520, riser tubes 560, and a collection rail 540 with both an open and a closed end, as well as rail couplers 545, with one rail coupler containing a drain down orifice 640, and removable filter cartridge caps 535. Water travels through the filter material of the filter cartridge(s) 520 through the perforated inner cartridge housing 660 of the filter cartridge, into the top of the riser tube(s) 560, falling down the riser tube(s), then passively rising back up between the riser tube(s) 560 and the filter cartridge(s) 520, enabling the entire filter cartridge to be used for filtration, thereby evenly distributing the sediment load removed from the treated water.

In some embodiments, the box system 300 exit openings of collection rails 541 are sized to control the rate at which water flows through the system. By limiting water flow through filter cartridges 520 to a rate lower than the capacity thereof, the pollutant removal efficiency and the useful life between maintenance and/or replacement of filter cartridges 520 can be increased.

In the process of performing their filtration functions, filter cartridges 520 with internal riser tubes 560 reduce the head pressure between the influent and effluent sides of the filter cartridge 520 and thus reducing the flow rate through the filter cartridges 520 and creating a safety factor in the amount of water the cartridges treat, thereby increasing filter life. This impedance makes possible conditions in which water enters inflow opening 335 at a rate greater than it flows from filtration chambers 500 into discharge chamber 600 through filter cartridges 520 and collection rail 540 ("high flow conditions"). The top of the section of discharge chamber wall 610 that abuts secondary separation chamber 450 and diversion weir of separation chamber partition(s) 425 is positioned between the top of diversion weir and the top of discharge chamber wall 610, forming a bypass weir 620. Under high flow conditions, water level rises in filter chambers 500 to the point that water flows over bypass weir 620 into discharge chamber 600 (FIG. 1). Under high flow conditions, it is possible for water levels to rise above the highest sections of separation chamber partition(s) 425 and discharge chamber wall 610; and during such conditions water flows over the entirety of discharge chamber wall 610 into discharge chamber 600.

In some embodiments, filter cartridges and riser tubes are, for facile cleaning and replacement, removeably mountable onto a collection rail by, for instance, with rail coupler hardware such as friction fittings, threaded fittings, bolts, screws, nails, clamps, and the like. In some embodiments, filter cartridges and riser tubes are permanently mounted onto a collection rail by, for instance, by welding.

In some embodiments, filter cartridges comprise rigid housings made of durable material such as metal, plastic, or fiberglass loaded with filtration material (e.g., as fiberglass, glass wool, and steel wool) or inorganic filtration media (e.g., zeolite, expanded aggregate, lava rock, oxide-coated inert material, alumina, pumice, and other similar oxides). Such inorganic filtration material and media is operative to remove not only large and fine sediment and debris but also dissolved pollutants from water.

In such embodiments, the perforated inner cartridge housing allows water to pass through the filtration unit and retain the filtration material or media within the housing. These same openings also allow filtered water to enter the top of riser tubes. In some embodiments, multiple filtration cartridge assembly can be equipped with lids or hatches to that provide access to the filtration material or media for removal or cleaning.

In some embodiments, the vertical filter of at least one of the one or more filter cartridge(s) comprises a sheet of filter material formed into a cylinder closed by a top end that is water impermeable and a bottom end that is water impermeable apart from an opening through which water can flow. In such embodiments, the coupler is adapted to place the opening in the bottom end of the filter cartridge with internal riser tube in sealed, fluid communication with the filter opening of at least one or more filter cartridge(s) and riser tube(s).

In some embodiments, the sheet of filter material in the filter cartridge is selected from the group consisting of a plastic, a paper, a fiberglass, and a combination thereof. In some embodiments, the sheet of filter material comprises back and forth folds that form a series of pleats.

In some embodiments, the rail coupler is adapted to removeably mount one or more filter cartridge with internal riser on the collection rail.

In some embodiments, the riser tube material is selected from the group consisting of plastic, fiberglass, metal, and a combination thereof.

In other embodiments, the box possesses a ceiling, a floor, two lateral walls, two endwalls, an inflow opening, an outflow opening, a discharge chamber wall, and one or more collection rail(s) coupled with internal riser tubes wherein the riser tube(s) is within one or more filter cartridge(s). Drain down openings in one or more riser tubes within proximity with the floor of the collection rail are configured to allow the filtration chambers to drain down between storm events to prevent standing water.

In such a configuration, the discharge chamber wall is in sealed connection with the floor and the two lateral walls, but not the ceiling, such that the discharge chamber wall partitions the box into a filtration chamber that abuts the inflow opening and a discharge chamber that abuts the outflow opening. The inflow opening is: i. positioned in the ceiling, one of the two lateral walls, or one of the two endwalls, ii. is in sealed, fluid communication with SRWC infrastructure upstream of the box, and iii. abuts the filtration chamber. The outflow opening: i. is positioned in the floor in or in proximity with the floor in one of the two lateral walls or one of the two endwalls; ii. is in sealed, fluid communication with the SRWC infrastructure downstream of the box; and iii. abuts the discharge chamber.

Also in such embodiments, each of the one or more collection rail(s) comprises: i. a hollow tube, or duct with a series of holes on the upper surface for attachment for couplers, which extends from the discharge chamber to the filtration chamber, sealingly through the discharge chamber wall, and ii. one or more filter cartridge(s). The collection rail comprises an outflow opening located in the discharge chamber. The one or more filter cartridge(s) comprises a vertical filter, a perforated filter housing, an internal riser tube, an opening at the bottom of the filter cartridge with internal riser tube, and a rail coupler that mounts both the filter cartridge and the riser tube on the collection rail and places the both the filter cartridge and the filter opening and riser tube in sealed, fluid communication. The collection rail is configured such that: i. each of the one or more filter cartridge(s) are positioned in the filtration chamber, and ii. the collection rail is water impermeable apart from the exit opening and the filter opening of each of the one or more filter cartridge(s) and riser tube(s). The collection rail is operative to allow water to flow from the filtration chamber to the discharge chamber by passing through at least one or more riser tube(s) and at least one or more of the filter cartridge(s), and the exit opening of the collection rail.

Also in such embodiments, the top of the discharge chamber wall is positioned in the box such that in conditions of: i. low to moderate water flow through the system, a flow path of water is from the inflow opening into the filtration chamber, through at least one of the one or more collection rail(s) into the discharge chamber, and through the outflow opening; and ii. high water flow through the system, an additional flow path of water is from the inflow opening into the filtration chamber, over the discharge chamber wall into the discharge chamber, and through the outflow opening.

In some embodiments, the box further comprises a cap or a plug sealingly mounted on the exit openings of collection rails. In such embodiments, the cap or the plug is water impermeable apart from one or more aperture(s) sized, individually or in aggregate, to control a rate of water flow through the exit openings of collection rails that is less than a maximum rate of water flow through at least one filter of the one or more filter cartridge(s) with internal riser tube(s).

In some embodiments, configurations of the system in which the present invention is included can be customized depending on site needs, government regulations, and consumer preference. The interchange, for example, of different number of separation chambers and different types and numbers of weirs, including oil skimmers, low flow diversion, and bypass weirs disclosed herein, merely serve to support the primary functions of the invention without equating to an overall change in the function and purpose of the system.

In some embodiments, the box further comprises a discharge weir in the separation chamber wall or filter chamber walls adjacent to the discharge chamber wall. In such embodiments, the discharge weir is configured to permit water to flow therethrough and is thereby operative to increase: i. an average distance travelled by water through the separation chamber prior to flowing into the filtration chamber; and therefor ii. an amount of sediment settling in the separation chamber.

In some embodiments, the box further comprises a bypass weir in the discharge chamber wall adjacent to the separation chamber. In such embodiments, the bypass weir is configured to establish, in the condition of high water flow through the system, a second additional flow path of water from the inflow opening into the separation chamber, through the bypass weir into the discharge chamber, and through the outflow opening. In such embodiments, the second additional water flow path reduces an amount of scouring of sediments out of the filtration chambers that results from water flowing over the top of the filtration chamber wall.

Some embodiments of the box provides collection rails configured for installation comprising a secondary filtration chamber and a discharge chamber, the collection rail comprising an exit opening of the collection rail and one or more filter cartridge(s) with one or more internal riser tube(s). The one or more filter cartridge(s) comprise(s) a vertical filter, a filter opening, and a rail coupler that mounts the vertical filter on the collection rail and places the vertical filter and the filter opening in sealed, fluid communication. The one or more riser tube(s) comprises a hollow tube with openings at both the top and bottom to allow for passive water conduction. The collection rail is configured to position, when installed in the water treatment system: i. each of the one or more filter cartridge(s) in the secondary filtration chamber, and ii. the exit opening in the discharge chamber. The collection rail is configured to establish, when installed in the water treatment system, a flow path for water from the filtration chamber through at least one or more filter cartridge(s) with internal riser tube(s), the exit opening of the collection rail, the outflow opening, and into the discharge chamber.

The apparatus and methods described are the preferred and alternate embodiments of this invention, but other methods are possible and are within the contemplation of this patent.

What is claimed is:

1. A multiple filtration cartridge assembly designed to fit within a structure, the assembly comprising:
   one or more hollow collection rail(s) with one or more opening(s), with at least one opening for flow out of the rail on an end of said rail, and at least one opening for flow into the rail located on the top of said rail,
   wherein said collection rail(s) are designed to be positioned horizontal in a bottom portion of the structure,
   wherein said openings of said collection rail(s) are coupled to one or more solid internal riser tube(s) with open tops to allow water to flow into the center of said internal riser tube(s) and transfer water into the collection rail(s),
   said internal riser tube(s) are coupled to allow one or more filter cartridge(s) to be placed surrounding the internal riser tube(s), with said filter cartridges comprised of a perforated inner cartridge housing, and an outer filter media,
   wherein, said filter cartridge(s) are taller than said riser tube(s), and as such are installed enclosing the area around said riser tube(s) in contact with said collection rail(s) and forming a water-tight seal with the horizontal collection rail(s), wherein said one or more riser tube(s) extend up into the one or more filter cartridge(s) such that water passing through said filter cartridge(s) media must travel from the inside of the perforated inner cartridge housing(s) and up to the top of the internal riser tube(s) and back down to the collection rail(s),
   said collection rail(s) extending to an outlet portion with an open end to allow water treated by said filter cartridge(s) to exit said collection rail(s),
   wherein the internal riser tubes and filter cartridges are mounted on the collection rail with two or more rail couplers and wherein one of the riser tubes contain a drain down orifice.

2. The multiple filtration cartridge assembly of claim 1, wherein the riser tube material is selected from the group consisting of plastic, fiberglass, composite, metal and a combination thereof.

3. The multiple filtration cartridge assembly of claim 1, wherein the riser tube(s) comprise a hollow tube and openings at both the top and bottom of the riser tube(s).

4. The multiple filtration cartridge assembly of claim 1, wherein the filter cartridge(s) comprises a sheet of filter material formed into a cylinder closed by atop end that is water impermeable and a bottom end that is water impermeable apart from an opening through which water can flow, and wherein a coupler of the two or more rail couplers is adapted to place the opening in the bottom end of the filter cartridge with the riser tube(s) in sealed, fluid communication with the filter opening of at least one of the one or more filter cartridge(s).

5. The multiple filtration cartridge assembly of claim 4, wherein the sheet of filter material is selected from the group consisting of a plastic, a paper, a fiberglass, and a combination thereof.

6. The multiple filtration cartridge assembly of claim 4, wherein the filter material wraps around the perforated inner cartridge housing of the filter cartridges.

7. The multiple filtration cartridge assembly of claim 4, wherein the sheet of filter material comprises back and forth folds that form a series of pleats.

8. A partitioned water treatment system comprising the multiple filtration cartridge assembly of claim 1, wherein said assembly is further configured for installation within the partitioned water treatment system and said system is comprised of
   a box configured for installation into a flow stream of a surface runoff water conveyance infrastructure (SRWC infrastructure),
   wherein the box, possessing a ceiling, a floor, two lateral walls, two endwalls, an inflow opening, an outflow opening, a discharge chamber wall, wherein:
   the discharge chamber wall is in sealed connection with the floor and the two lateral walls, but not the ceiling, such that the discharge chamber wall partitions the box into a filtration chamber that abuts the inflow opening and the discharge chamber that abuts the outflow opening,
   the inflow opening is: i. positioned in the ceiling, one of the two lateral walls, or one of the two endwalls; and ii. configured for achieving sealed, fluid communication with SRWC infrastructure upstream of the partitioned water treatment system,
   the outflow opening: i. positioned in the floor in or in proximity with the floor in one of the two lateral walls or one of the two endwalls; and ii. configured for achieving sealed, fluid communication with the SRWC infrastructure downstream of the partitioned water treatment system,
   each of two or more collection rails comprises: i. two or more exit openings of the collection rail that extends from the discharge chamber to the filtration chamber, sealingly through the discharge chamber wall, and ii. two or more riser tubes in fluid communication, iii. two or more filter cartridges:
   each of the collection rails further comprising an exit opening of the two or more exit openings in the discharge chamber and is configured such that: i. each of the two or more filter cartridges are positioned in the filtration chamber, and ii. the collection rails are water impermeable apart from the exit opening and of each of the two or more filter cartridges, and
   the collection rails are operative to allow water to flow from the filtration chamber to the discharge chamber by passing through at least one of the two or more filter cartridges, at least one of the two or more rail couplers, and the exit opening, the top of the discharge chamber wall is positioned in the box such that in conditions of:
  i. low to moderate water flow through the system, a flow path of water is from the inflow opening into the filtration chamber, through at least one of the two or more collection rail(s) into the discharge chamber, and through the outflow opening, and
  ii. high water flow through the system, an additional flow path of water is from the inflow opening into the filtration chamber, over the discharge chamber wall into the discharge chamber, and through the outflow opening.

9. The partitioned water treatment system of claim 8, further comprising a cap or a plug sealingly mounted on the exit openings in the discharge chamber, wherein the cap or the plug is water impermeable apart from one or more aperture(s) sized, individually or in aggregate, to control a rate of water flow through the exit openings of the rails that is less than a maximum rate of water flow through at least one filter of the filter cartridges.

10. The partitioned water treatment system of claim 8, further comprising a bypass weir in the discharge chamber wall adjacent to a separation chamber, wherein the bypass weir is configured to establish, in the condition of high water flow through the system, a second additional flow path of water from the inflow opening into the separation chamber, through the bypass weir into the discharge chamber, and through the outflow opening, and wherein the second additional flow path of water is operative to promote a laminar flow of water through the separation chamber.

11. The partitioned water treatment system of claim 8, wherein each individual filter cartridge of the two or more filter cartridges comprises a sheet of filter material formed into a cylinder closed by a top end that is water impermeable and a bottom end that is water impermeable apart from an opening through which water can flow, and wherein a coupler of the two or more rail couplers is adapted to place the opening in the bottom end of the filter material in sealed, fluid communication with the filter opening of the individual filter cartridge.

12. The partitioned water treatment system of claim 11, wherein the sheet of filter cartridge material comprises back and forth folds that form a series of pleats which cover the perforated inner cartridge housing of the filter cartridge.

13. The partitioned water treatment system of claim 8, wherein the riser tube material is selected from the group consisting of plastic, composite, fiberglass, and a combination thereof.

14. The partitioned water treatment system of claim 8, wherein the riser tubes each comprise a hollow tube and openings at both the top and bottom of each riser tube for fluid communication and wherein at least one of the riser tubes contains a drain down orifice.

15. The partitioned water treatment system of claim 11, wherein the riser tubes of the filter cartridges are adapted to removably mount the filter cartridges on the collection rails.

16. The partitioned water treatment system of claim 8, wherein the rail couplers of the filter cartridges are adapted to removably mount the filter cartridges on the collection rails.

17. The partitioned water treatment system of claim 8, wherein the internal riser tubes and filter cartridges are mounted on the collection rails with the rail couplers and wherein the rail couplers contain the drain down orifice in sealing, fluid connection with the corresponding drain down orifice with the internal riser tubes.

18. The partitioned water treatment system of claim 8, comprising at least one separation weir selected from a group consisting of low flow diversion weir(s), bypass weir(s), and oil skimmer weir(s).

19. The multiple filtration cartridge assembly of claim 1, wherein said internal riser tube(s) are stationary.

* * * * *